US006586079B1

(12) United States Patent
Shibahara et al.

(10) Patent No.: US 6,586,079 B1
(45) Date of Patent: Jul. 1, 2003

(54) RECORDING MATERIAL AND RECORDING METHOD

(75) Inventors: Yoshihiko Shibahara, Minami-ashigara (JP); Fumihiro Oguri, Minami-ashigara (JP); Mio Fujimoto, Minami-ashigara (JP); Tsutomu Iida, Chofu (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/577,679

(22) Filed: May 22, 2000

(30) Foreign Application Priority Data

May 21, 1999 (JP) ........................................ 11-141303

(51) Int. Cl.[7] ................................................ B32B 3/00

(52) U.S. Cl. ....................... 428/195; 428/212; 428/213; 428/480

(58) Field of Search ................................ 428/195, 133, 428/212, 213, 215, 480

(56) References Cited

U.S. PATENT DOCUMENTS

| | | | | |
|---|---|---|---|---|
| 5,192,548 A | * | 3/1993 | Velasquez et al. | 424/443 |
| 5,409,758 A | * | 4/1995 | Hiyoshi et al. | 428/138 |
| 5,964,543 A | * | 10/1999 | Sakamoto et al. | 400/586 |

FOREIGN PATENT DOCUMENTS

| | | | |
|---|---|---|---|
| JP | 3-38659 | 2/1991 | G03G/15/01 |
| JP | 4-212168 | 8/1992 | G03G/7/00 |
| JP | 5-53474 | 3/1993 | G03G/15/20 |
| JP | 5-216322 | 8/1993 | G03G/15/01 |
| JP | 6-34976 | 2/1994 | G02F/1/1337 |
| JP | 6-79576 | 11/1994 | B42D/15/02 |
| JP | 10-166748 | 6/1998 | B41M/7/00 |
| JP | 10-203056 | 8/1998 | B42D/15/02 |
| JP | 10-221877 | 8/1998 | G03G/7/00 |
| JP | 10-264557 | 10/1998 | B42D/15/02 |

* cited by examiner

*Primary Examiner*—Deborah Jones
*Assistant Examiner*—Ling Xu
(74) *Attorney, Agent, or Firm*—Sughrue Mion, PLLC

(57) ABSTRACT

A recording material having a resin layer containing a polyester resin as a main component on a support, the recording material is disclosed in having (A) a groove or grooves placed continuously or intermittently extending linearly with a depth not less than 45% but not more than 90% of the thickness of the recording material, or (B) linearly continuous holes wherein width of the holes is not less than 15·m and not more than 130·m, length of the holes is not less than 50·m and not more than 500·m, and interval between the holes is not less than 30·m and not more than 300·m. In use of this recording material, printed items in a desired size can be formed rapidly and easily.

4 Claims, 1 Drawing Sheet

RECORDING MATERIAL AND RECORDING METHOD

TECHNICAL FIELD

This invention relates to a recording material capable of easily obtaining printed materials in a prescribed size and a recording method using the same.

RELATED ART

Recently, digital color printers have been developed remarkably and can print color photos, illustrations, letters, and images in combination of those with high image quality. Electrophotographic method among those constitutes important printing means from aspects of, e.g., good flexibility of paper selection, good printing speed, and low costs of consumptive goods. In the case of electrophotographic method, however, gloss may vary on the printed sheet between a portion at which toners are added to create images and a portion at which no toner is added and no image is formed, thereby raising problems such that viewers may feel discomfort or that may receive unnatural impression from existence of "a relief" at which toner images are formed thickly.

As a means for obtaining good image quality in solving those problems, an electrophotographic copier sheet has been disclosed in Japanese Unexamined Patent Publication (hereinafter called as "JP-A") No. 4-212168 in which a resin layer having a softening temperature lower than the toner resin and a viscosity different from that of the toner resin. In JP-A-10-221877, an electrophotographic transfer sheet has been disclosed in which a polyester resin with defined molecular weight and melting inclination angle against the toner resin is formed on a support. In JP-A-3-38659, an image forming method is disclosed in which a printing is made on a paper having a transparent coating layer having defined relation of the toner resin and melting viscosity form on a support. Moreover, in JP-A-5-216322, a method for forming color images on a paper having a transparent resin layer with a defined thickness has been disclosed. Use of paper having such a resin layer on at least one side allows printing with good gloss and surface smoothness.

High quality printing paper is frequently used for printing photos, providing photos as gifts, and preserving photos in albums. Moreover, those can be sent by mail as postcards or message cards. In such a case, users are required to cut photos in a size suitable for such a purpose or use a paper in a desired side. However, cutting the paper after printing takes time, and particularly, such cutting is frequently not practical for business use. Automatic cutters are available in some places but are expensive (i.e., about 500,000 yen as the actual price of an apparatus for automatically cutting an A4 size sheet into four postcards, on April, 1999) and have limited usage because of largeness of the cutters. Conversely, if a desired size paper is used, cutting may be unnecessary, but there raise problems such that a particular size paper becomes necessary and that printing time becomes longer in comparison with printing using a larger size paper.

Papers having holes and indentations are widely used in many fields. For example, a recording medium for inkjet that can be divided easily along a perforation into two or more is disclosed in JP-A-10-166748. In JP-A-10-203056, disclosed are papers for greeting cards and notifying cards with micro-perforations in which a prescribed shape is easily cut out JP-A-5-53474 discloses an electrophotographic paper that can be folded along perforations; JP-A-10-264557 discloses a detachable, re-peelable postcard; JP-A-6-34976 discloses a copy paper with micro-perforations. In Japanese Unexamined Utility Model Publication No. 6-79576, a postcard having a flipper openable in a way of a door after cutting along a perforation where a center portion of the card body is surrounded by the perforation except one edge.

The paper generally commercially available, however, raises problems such that the paper cannot bring image quality as good as photos and that the paper may cause image disorders at the vicinity of the perforation where commercially available paper with such a perforation is used, so that satisfactory image quality cannot be obtained even where a photographic paper with a coated resin layer is used. For example, the art in JP-A-10-166748 is intended to easily obtain a printed material having a quality as good as photos, but the art is designed to use an inkjet printing and does not disclose any formation of a resin layer having a polyester as a main component nor disclose a problem that a perforation may disturb images of electrophotographic printing.

In consideration of those problems in such prior arts, it is an object of the invention to provide a recording material capable of forming printed materials in a desired size easily and rapidly. Particularly, it is an object of the invention to provide a recording material capable of taking less time, producing printed materials with a shorter time, and obtaining good images where digital image information is printed with multicolor in a desired size.

SUMMARY OF THE INVENTION

As consequences of diligent study made by the inventors, the inventors have found out a printing can be made in a desired size rapidly and easily upon formation of particular grooves on the recording material or particular holes in the recording material having a resin layer containing a polyester resin as a main component on a support and created the invention.

That is, this invention is, as a first aspect, to provide a recording material having a resin layer containing a polyester resin as a main component on a support and further having a groove or grooves continuously or intermittently extending linearly with a depth not less than 45% but not more than 90% of the thickness of the recording material.

This invention is also to provide, as a second aspect, a recording material having a resin layer containing a polyester resin as a main component on a support and further having linearly continuous holes wherein the width of the holes is not less than 15 $\mu$m and not more than 130 $\mu$m, the length of the holes is not less than 50 $\mu$m and not more than 500 $\mu$m, and the interval between the holes is not less than 30 $\mu$m and not more than 300 $\mu$m.

This invention is also to provide a recording method for recording material in which toners are transferred to an intermediate transfer drum from an electrophotographic photosensitive drum and subsequently transferred from the intermediate transfer drum to the recording material.

DETAILED DESCRIPTION OF THE INVENTION

Figure 1:
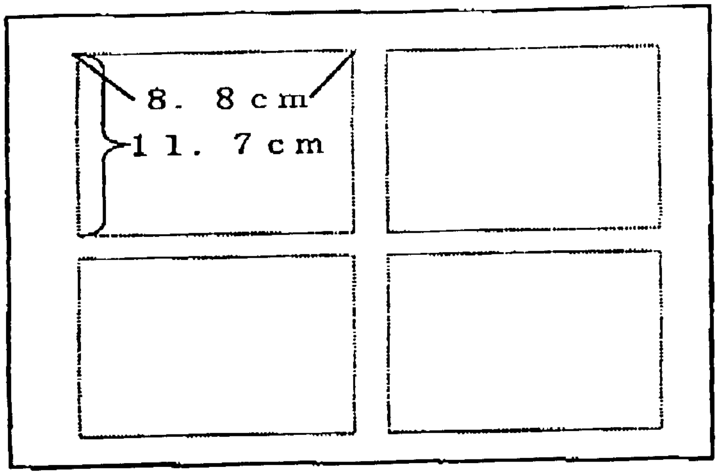
FIG. 1 is a diagram showing a recording material in the A4 size formed with grooves to cut out four L size sheets (horizontally 11.7 cm and vertically 8.8 cm).

Hereinafter, a recording material and a recording method according to the invention are described in exemplifying preferred embodiments.

This invention is, as a first aspect, to provide a recording material having a resin layer containing a polyester resin as a main component on a support and further having a groove or grooves continuously or intermittently extending linearly with a depth not less than 45% but not more than 90% of the thickness of the recording material.

As a support used for the recording material of the invention, any material can be used as far as durable at the fixing temperature and satisfactory in terms of smoothness, whiteness, sliding property, frictional property, antistatic property, and dents after fixing. Generally, a support for photography such as paper, synthetic polymers (film) as described in "Shasin Kogaku no Kiso—Engin Shashin Hen" (Fundamentals on Photographic Engineering Vol. Silver Halide Photograph) composed by Nihon Shashin Gakkai, Published by Corona Sha (Showa 54 (1979)), pages 223 to 240 can be exemplified. Specific examples to be used include paper supports such as quality papers, (double side) art papers, (double side) coated papers, cast-coated papers, mixed paper produced from pulp of synthetic resins such as polyethylene or the like and natural pulp, yankee papers, baryta papers, wallpapers, guard papers, synthetic resin or emulsion impregnated papers, synthetic rubber latex impregnated papers, synthetic resin-innerly added papers, paperboards, cellulose fiber papers, polyolefin coated papers (especially coated on the double sides with polyethylene) or the like, respective plastic film or sheet such as polyolefin, polyvinyl chloride, polyethylene terephthalate, polystyrene metacrylate, polyethylene naphthalate, polycarbonate, polyvinyl chloride, polystyrene, polypropylene, polyimide, celluloses (for example, triacetyl cellulose) or the like and the films and sheets with aforementioned plastics subjected to treatments for providing white reflexiveness (for example, a treatment for providing a film with pigment such as titanium oxide), cloth, metals, glasses or the like. These can be used alone, or used as a support laminated on one side or double sides with synthetic polymers such as polyethylene or the like. Also, a multilayer support formed by an arbitrary combination of the above supports can be used. Other usable supports are described in JP-A-62-253159; pp. 29 to 31, JP-A-1-61236; pp.14 to 17, JP-A-63-316848, JP-A-2-22651, JP-A-3-56955, and U.S. Pat. No. 5,001,033.

Those supports preferably have a thickness of, generally, 25 to 300 μm, preferably 50 to 360 μm and especially preferably 75 to 250 μm.

The structural layer of the support as described above may be added with various types of suitably selected additives within a range which does not impair the object of the invention. For example, pigments or dyes such as a whitener, a conductive agent, a filler, titanium oxide, ultramarine, or carbon black may be, if necessary, contained.

In addition, one side or both sides of the supports can be subjected to various types of surface treatments or base coatings for improving adhesion to the layer to be formed on the support. The surface treatment include, for example, printing in JP-A-55-26507, matte surfaces or tweed surfaces, as well as activation processings such as corona discharge processing, flame processing, glow discharge processing or plasma processing. As a base coating, the method described in JP-A-61-846443, for example, can be utilized. These processings may be carried out alone, or arbitrarily combined together such that activation processing is made after printing process, or base coating is further made after surface treatment such as activation processing.

In the Structure of these supports, at the surfaces or back surfaces and in those combinations, semiconductive metal oxide such as hydrophilic binder, aluminasol, or tin oxide, carbon black, and other antistatic agents may be applied Specifically, the support described in JP-A-63-220246 can be used.

The recording material of the invention has a resin layer containing a polyester resin as a main component on the above support. The resin layer is formed on a single side or double sides. The thickness of the recording material of the invention, including the support and the resin layer, is not less than 80 μm and not more than 300 μm, more preferably not less than 110 μm and not more than 250 μm, and further more preferably not less than 140 μm and not more 220 μm.

The recording material of the invention has a groove or grooves continuously or intermittently extending linearly. The depth of the groove is preferably not less than 45% and not more than 90% of the thickness of the recording material, more preferably not less than 50% and not more than 85%, and further more preferably not less than 60% and not more than 80%. In addition, the depth of the groove is preferably not less than 36 μm and not more than 270 μm, more preferably not less than 60 μm and not more than 200 μm, more preferably not less than 60 μm and not more than 200 μm, and further more preferably not less than 80 μm and not more than 180 μm.

The grove included in the recording material of the invention is continuously or intermittently extending linearly, preferably intermittently. Where the grove extends continuously, the length of the straight line is not less than 3 mm and reaches an end of the paper. Where the groove extends intermittently, the width of the groove is preferably not less than 15 μm and not more than 130 μm, more preferably 20 μm and not more than 100 μm, and further more preferably 30 μm and not more than 80 μm, respectively. The length of the groove is preferably not less than 50 μm and not more than 500 μm, and further more preferably 60 μm and not more than 300 μm, and further more preferably 100 μm and not more than 250 μm, respectively. The interval between the grooves placed intermittently is not less than 30 μm and not more than 300 μm, more preferably 50 μm and not more than 250 μm, and further more preferably 80 μm and not more than 180 μm, respectively.

The recording material of the invention preferably has the resin layer and the grooves formed on one side of the support, and the grooves are preferably formed on the opposite side to the resin layer.

This invention is also to provide, as a second aspect, a recording material having a resin layer containing a polyester resin as a main component on a support and further having linearly continuous holes wherein the width of the holes is not less than 15 μm and not more than 130 μm, the length of the hole is not less than 50 μm and not more than 500 μm, and the interval between the holes is not less than 30 μm and not more than 300 μm. the hole is preferably not less than 20 ·m and not more than 100·m, more preferably 30·m and not more than 80·m. The length of the hole is preferably 60·m and not more than 300·m, and more preferably 100·m and not more than 250·m. The interval between the holes placed successively is preferably 50·m and not more than 250·m, and more preferably 80·m and not more than 180·m The recording material of the invention has the resin layer containing a polyester resin as a main component on the support. The flow beginning temperature of the polyester resin is preferably not less than 50° C. and not more than 100° C. Where this recording material is used for electrophotographic printing, the flow beginning temperature of the polyester resin is preferably lower than a flow beginning temperature of the used toner resin for electrophotography plus 10° C. The flow beginning temperature can be measured with Flow Tester CFT-500 made by Shimazu Sensakusho Co.

AS the recording material of the invention, the recording material is an electrophotographic paper, and in respect to the softening temperature of the toner resin used for electrophotography, it is particularly preferable to use a polyester resin having a viscosity less than the viscosity of the toner resin. The softening temperature and the viscosity of the resin can be measured with Flow Tester CFT-500 made by Shimazu Seisakusho Co.

The invented recording material having the resin layer containing the polyester resin as a main component is suitable for electrophotographic printing, and the resin layer makes the toner image receiving layer of electrophotography. The thickness of the image receiving layer is preferably about 3 to 50 μm. The image receiving layer renders the toners cling, and includes, solely or with binders, materials (hereinafter referred to as "receptor material") for fixing and holding toners by heat when fixing is made.

As the image receiving layer (resin layer having the polyester resin as the main component) of the invention, the property of the image receiving layer is preferable to satisfy, in addition to the above conditions, the following one or more terms, more preferably plural terms, further more preferably all the following terms.

(1) The glass transition temperature Tg of the image receiving layer is no less than 30° C. and no more than toner's Tg +20° C.

(2) The T1/2 (1/2 method softening point) of the image receiving layer is in a range of 60 to 150° C., more preferably 80 to 120° C.

(3) Temperature that the viscosity of the image receiving layer becomes $1\times10^5$ Pa.S is 40° C. or higher and lower than the temperature that the viscosity of the toner becomes $1\times10^5$ Pa.S.

(4) The storage elastic modulus (G') at a fixing temperature of the image receiving layer is no less than $1\times10^2$ Pa and no more than $1\times10^5$ Pa, and loss elastic modulus (G") is no less than $1\times10^2$ Pa and no more than $1\times10^5$ Pa.

(5) The loss tangent (G"/G') as the ratio of the loss elastic modulus to the storage elastic modulus (G') at a fixing temperature of the image receiving layer is no less than 0.01 and no more than 10.

(6) The storage elastic modulus (G') at a fixing temperature of the image receiving layer is no less than −50 and no more than +2500 with respect to the storage elastic modulus (G') at a fixing temperature of the toner.

(7) The inclined angle on the image receiving layer of the melting toners is not more than 50., preferably not more than 40.

The image receiving layers preferably satisfy property disclosed in Japanese Patent Publication No. 2788358, JP-A-7-248,637, JP-A-8-305,067, JP-A-10-239,889.

The property in the term (1) can be measured by a differential scanning calorie measurement apparatus (DSC). The property in the terms of (2) and (3) can be measured by a flow tester CFT-500 made by Shimazu Seisakusho. The property in the terms of (4) to (6) can be measured by a rotary type rheometer (e.g., Dynamic Analyzer RAD II made by Rheometric Co.). The property in the term of (7) can be measured with a method described in JP-A-8-334,916 using a contact angle measurement apparatus made of Kyowa Kaimen Kagaku K.K As polymers as representative examples for receptor material, exemplified are polymers having ester linkages; polyurethane resin; polyamide such as urea resin or the like; polysulfone resin; polyvinyl chloride resin, polyvinylidene chloride resin, vinyl chloride.vinyl acetate copolymer resin, vinyl chloride.vinyl propionic acid copolymer resin; polyol resin such as polyvinyl butyral or the like, ethyl cellulose resin, cellulose resin such as cellulose acetate resin or the like; polycaprolactone resin, styrene maleic anhydride resin, polyacrylonitrile resin, polyether resin, epoxy resin, phenol resin; polyethylene resin, polyolefin resin such as polypropylene resin or the like, copolymer resin of olefin such as ethylene, propylene or the like with other vinyl monomer, acrylic resin, or the like. The receptor material can be used solely or can be used as a mixture or copolymer in combination of two or more types.

As such a receptor material, a material containing polyester resin is preferable. A polymer containing polyester resin of 20% by weight or higher is particularly preferable.

As resins having ester linkages, exemplified are polyester resins obtained by condensation of dicarboxylic acid components (sulfonic acid group, carboxyl group or the like can be substituted in these dicarboxylic acid components) such as terephthalic acid, isophthalic acid, maleic acid, fumaric acid, phthalic acid, adipic acid, sebacic acid, azelaic acid, abietic acid, succinic acid or the like with poly alcohol components (hydroxy group or the like can be substituted in these alcohol components) such as ethylene glycol, diethylene glycol, propylene glycol, bisphenol A, bisphenol S, 2.ethyl cyclohexyl diethanol, neopentyl glycol or the like; polyacrylic acid ester resin or polymethacric acid ester resin such as polymethyl methacrylate, polybutyl methacrylate, polymethyl acrylate, polybutyl acrylate or the like; polycarbonate resin; polyvinyl acetate resin; styrene acrylate resin, styrene. methacric acid ester copolymer resin, vinyl toluene acrylate resins or the like. Specific examples raised are described respectively in JP-A-59-101395, JP-A-63-7971, JP-A-63-7972, JP-A-63-7973, and JP-A-60-294862. Following commercial products can be used such as VYLON 290, VYLON 200, VYLON 280, VYLON 300, VYLON 103, VYLON GK. 140, and VYLON GK 130 manufactured by Toyobo Co., Ltd., TUFTONE NE.382, TUFTONE U. 5, ATR. 2009, and ATR. 2010 manufactured by Kao Corporation, Elitel UE 3500, UE 3210, and XA. 8153 manufactured by Unitika Ltd., Polyester TP.220, and R. 188 manufactured by Nippon Synthetic Chemical Industry Co., Ltd, or the like.

The image receiving layer containing one or more of those receptor materials can be formed by dispersing the receptor materials in water soluble binder and carrying the material. It is preferred to use a water-soluble polymer having a group reacting to form crosslink with a hardener and, more preferably, a polyvinyl alcohol, gelatin and the like among those polymers.

A coated film can be formed so that the receptor material keeps grain forms in the water soluble binder, and in such a case, the image receiving layer can be selected from materials forming a coating film at a temperature fixing the toners with heats. Known water soluble polymers can be used as water soluble binders in this case.

Virtually any known dispersing method can be used when a hydrophobic material is dispersed in water soluble polymers as a dispersing method for the receptor material in the water soluble binder. As representative methods, followings can be raised such as a method for emulsifying and dispersing liquid, which has a receptor material dissolved with water and a nonmiscible organic solvent, mixed with solution of water-soluble binder, a method for mixing latex of the toner-receptor material (polymer) with solution of the water-soluble binder, or the like.

The water-soluble polymer has no limitation with respect to the composition, bonding structure, molecular weight, molecular weight distribution, and figure as long as it is polymer with water soluble characteristic Examples of the water soluble groups of the water-soluble polymers include hydroxy groups, carboxylic acid groups, amino groups, amido groups, ether groups or the like.

As the water-soluble polymers described in Research Disclosure No. 17643, p. 26; No. 18,716, p.307; No. 307, 105, pp. 873 to 874, and JP-A-64-13546, pp. 71 to 75. Specifically, vinylpyrrolidone.vinyl acetate copolymer, styrene vinylpyrrolidone copolymer, styrene maleic anhydride copolymer, water-soluble polyester, water-soluble polyurethane, water-soluble nylon, and water-soluble epoxy resin.

Water dispersion type resin such as water dispersion acrylic resin, water dispersion polyester resin, water dispersion polystyrene resin, water dispersion urethane or the like, emulsion such as acrylic resin emulsion, polyvinyl acetate emulsion, SBR (styrene-butadiene rubber) emulsion or the like, or these copolymers, mixtures, or aqueous solutions such as cation denatured substance can be suitably selected and used in combination of two or more kinds. Gelatin is selected from lime treatment gelatin, acid treatment gelatin, or decalcified gelatin or gelatin having a reduced amount of calcium or the like can be used in combination.

As a commercially available product of the water dispersion polyester, for example, VYLONAL MD-1250, MD-1930 manufactured by Toyobo Co., Ltd., PLASCOAT Z. 446, Z. 465, RZ. 96 manufactured by GOO Chemical Co., Ltd., ES. 611, ES. 670 manufactured by Dainippon Ink And Chemicals, Incorporated, and Pes-resin A. 160 P, A. 210, A. 620 manufactured by Takamatsu Oil & Fat Co., Ltd. may be raised.

Film forming temperature of the polymer to be used is preferably at room temperature or higher with respect to preservation before printing and preferably at 100° C. or less with respect to fixing of the toner particles.

The recording material of the invention may contain a variety of plasticizers. The plasticizer to be used has thermal physical property selected according to binders and other components of the layers constituting the recording material. For example, with respect to the melting temperature, Provided that a total weight of binder, plasticizer, and other components constituting a layer is 100% by weight, the adding amount of the plasticizer is preferably in a rage from 0.001 to 90% by weight, more preferably in a range from 0.1 to 60% by weight, especially preferably in a range from 1 to 40% by weight.

As such a plasticizer, it may be selected by referring to the followings: "Kagaku Binran" (ed. Chemical Society of Japan, published by Maruzen), "Katozai Sono Riron to Ouyo" (Kouichi Murai, published by Saiwai Shobo), "Katozai no Kenkyu, First volume", "Katozai no Kenkyu, Second volume" (ed. Kobunshi Kagaku Kyokai), "Binran Rubber Plastic Haigo Yakuhin" (ed. Rubber Digest Co.) or the like.

Following compounds can be used, such as esters (for example, phthalic acid esters, phosphoric esters, fatty acid esters, abietic acid esters, avidin acid esters, sebacic acid esters, azelaic acid esters, benzoic esters, butyric acid esters, epoxidation fatty acid esters, glycolic acid esters, propionic acid esters, trimerit acid esters, citric acid esters, sulfonic acid esters, carboxylic acid esters, succinic acid esters, maleic acid esters, fumaric acid esters, phthalic acid esters, stearic acid esters or the like), amides (for example, fatty acid amides, sulfoanides or the like), ethers, alcohols, paraffins, lactones, polyethylene oxys, silicone oils, fluorine compounds or the like described in each of publications, in which a plasticizer is referred to as a high boiling point organic solvent, a thermal solvent or the like, including JP-A-59-83154, JP-A-59-178451, JP-A-59-178453, JP-A-59-178454, JP-A-59-178455, JP-A-59-178457, JP-A-62-174754, JP-A-62-245253, JP-A-61-209444, JP-A-61-200538, JP-A-62-8145, JP-A-62-9348, JP-A-62-30247, JP-A-62-136646, JP-A-62-174754, JP-A-62-245253, JP-A-61-209444, JP-A-61-200538, JP-A-62-8145, JP-A-62-9348, JP-A-62-30247, JP-A-62-136646, and JP-A-2-235694.

In addition, low molecular weight products of polymers described below may be used. Commercially available are Adekacizers PN-170, PN-1430 manufactured by Asahi Denka Kogyo K.K, PARAPLEX-G-25, G-30, G-40 manufactured by C.P.HALL Co. Ltd., and Ester gum 8L-JA, Ester R-95, Pentalin 485LFK115, 4820, 830, Lewizole 28-JA, Picolastic A-75, ricotex LC, Crystalex 3085 manufactured by Rika Hercules, or the like.

Aforementioned products can be used for the purposes of adjusting slippery property (carrier property improvement by lower frictional force), improving fixing-part offset (peeling of toner or layers to fixing portions), adjusting curl balance, adjusting electrification (formation of toner electrostatic images) or the like.

In the recording material of the invention, a charge controlling agent may be contained in at least one layer to adjust transfer and adherence of toners. Conventionally known antistatic agents can be used as a charge controlling agent, and polyelectrolytes and electroconductive metal oxides may be used in addition to surfactants such as cationic based surfactants, anionic based surfactants, amphoteric surfactants, and nonionic based surfactants. For example, followings can be used, but not limited to, a cationic based antistatic agent such as quaternary ammonium salt, polyamine derivative or the like, an anionic based antistatic agent such as cation denatured polymethyl methacrylate, cation denatured polystyrene, alkyl phosphate or the like, a nonionic based antistatic agent such as anionic based polymer, fatty acid ester or the like.

The electroconductive metal oxides include ZnO, $TiO_2$, $SnO_2$, $Al_2O_3$, $In_2O_3$, $SiO_2$, MgO, BaO and $MoO_3$. These may be used alone, or the composite oxide of those above may be used. In addition, these metal oxides can further contain heterogeneous elements, for example, Al, In or the like with respect to ZnO, Nb, Ta or the like with respect to $TiO_2$, Sb, Nb, halogen element or the like with respect to $SnO_2$, by doping or the like.

The toner image receiving layer has preferably surface electric resistance in a range of $1 \cdot 10^6$ to $1 \cdot 10^{15}$ under the condition at 25 C and RH of 65% When the electric resistance is less than $1 \cdot 10^6$., the density of the resulting toner images tends to become low due to an insufficient amount of toners to be transferred to the image receiving layer. On the other hand, when the electric resistance is over $1 \cdot 10^{15}$., the density of the images tends to become low since more than a required amount of electric charges are produced, resulting in that toners are not sufficiently transferred. In other words, the image receiving sheet for electrophotography is electrostatically charged during treated, so it is easy to be attached by dusts. Also, misfeeding, double sending, discharge mark, toner transferring lacking or the like is easy to occur during copying operation. The heat-resistant layer containing water-soluble polymer is not necessarily subjected to electrification adjustment.

Additives for photography may be used in a blank sheet, a water-resistant layer, a blank sheet coating layer, a protective layer, a toner image receiving layer, a cushion layer, an undercoating layer, a heat insulating layer, a porous layer, a heat-resistant layer, an adhesive layer, a curl adjusting layer or the like which constitute the image receptor material for electrophotography of the invention.

For example, as such additives for photography, described are in the following pages of Research. Disclosure (hereinafter abbreviated as "RD") No. 17643 (December 1978), No. 18716 (November, 1979), No. 307105 (November, 1989). Corresponding portions are posted in Table 1 shown below.

TABLE 1

| Kinds of Additives | RD17643 | RD18716 | RD307105 |
|---|---|---|---|
| Whitener | Page 24 | Page 648 Right column | Page 868 |
| Stabilizer | Page 24 ~ 25 | Page 649 Right column | Page 868 ~ 870 |
| Photo absorber, UV absorber | Page 25 ~ 26 | Page 649 Right column | Page 873 |
| Dye-Image Stabilizer | Page 25 | Page 650 Right column | Page 872 |
| Hardener | Page 26 | Page 651 Left column | Page 874 ~ 875 |
| Binder | Page 26 | Page 651 Left column | Page 873 ~ 874 |
| Plasticizer, Lubricant | Page 27 | Page 650 Right column | Page 876 |
| Coating assistant agent, Surfactant | Page 26 ~ 27 | Page 650 Right column | Page 875 ~ 876 |
| Antistatic agent | Page 27 | Page 650 Right column | Page 876 ~ 877 |
| Matte agent | — | — | Page 878 ~ 879 |

For the recording material of the invention, organic and, or inorganic micro particles (hereinafter abbreviated as "matte agent") may be added to the structural layer for preventing blocking, improving slippery property, preventing electrification, improving releasing property, improving the white background and curls, and adjusting moisture image receiving sheet as a whole, or the like. It is preferable to use a matte agent having a diameter of 0.001 to 50 $\mu$m, especially preferable to use a matte agent having a diameter of 0.05 to 30 $\mu$m. It is desirable to design an average particle size of the matte agent depending on the thickness of the heat-resistant layer. For example, provided that a thickness of the heat-resistant layer is 10, an average particle size of the matte agent is preferably 0.01 to 500, more preferably 0.1 to 300, especially preferably 0.5 to 100. The matte agent may exist on the surface or inside of the heat-resistant layer. The coating amount of the matte agent is preferably from 0.001 to 20 g/m$^2$, more preferably from 0.003 to 10 g/m$^2$, and especially preferably from 0.005 to 5 g/m$^2$.

The known matte agents can be used; for example organic and, or inorganic micro particles described in JP-A-5.262055 can be used as matte agents. Specifically organic matte agents include melanin resin particles, melanin.formaldehyde copolymer particles, polyolefin resin particles such as polymethylmethacrylate particles, polyethylene particles or the like of the compounds described in JP-A-61.88256, p. 29, styrene resin particles, crosslinked polymethylmethacrylate particles and crosslinked polystyrene particles having improved heat-resistant property and abrasion resistant property by crosslinking, in addition to such compounds as benzoguanamine resin particles, polycarbonate resin particles, ABS resin particles described in JP-A-274944 and JP-A-63-274952. Examples of the inorganic matte agents include oxides (for example, titanium dioxide, silicon dioxide or the like), alkaline-earth metal salts (for example, hydrosulfate or carbonate, more specifically barium sulfate, calcium carbonate.or the like), silver halide particles which does not form images (for example, silver chloride, silver bromide or the like), or glasses.

The layers constituting the recording material of the invention may be harden by hardeners. When hardening organic solvent based polymer, hardeners described in Jr-A-61.199997, JP-A-58.215398 or the like can be used. With respect to polyester resin, using isocyanate based hardeners is especially preferable With respect to water-soluble polymers, a compound of the hardeners in RD described above is preferably used.

The recording material of the invention may contain a fluoroorganic compound, as a coating assistant agent, for improving slippery property, preventing electrification, improving releasing property or the like. As representative example of fluoroorganic compounds including fluorine based surfactants, oil fluorine compounds such as fluorine oil or the like, hydrophobic fluorine compounds of solid fluorine compound resin or the like such as ethylene tetrafluoride resin or the like described in Japanese Patent Publication (KOKOKU) Showa No. ("JP-B-") 57.9053, Column 8 to 17; JP-A-61.20944; JP-A-62.135826 or the like.

The recording material of the invention may be formed with a heat-resistant layer. As a material for forming a heat-resistant layer, any material can be used as long as it can resist a fixing temperature, but the layer containing water-soluble polymer is preferable, and especially more preferable is the layer containing water-soluble polymer of 10% by weight or higher. The mentioned polymers for image receiving layer, or water-soluble polymers or other organic solvent-soluble polymers or water-soluble polymers can be used as binder or main components constituting the layer. The preferable water-soluble polymer is the water-soluble polymer having a group crosslinkable by hardeners, and especially preferable is polyvinyl alcohol and gelatins.

The heat-resistant layer can be formed of two or more layers. The thickness of the heat-resistant layer or layers is 0.01 to 50 $\mu$m as a whole, more preferably in a range from 0.05 to 20 $\mu$m.

The layers constituting the recording material in the invention can be formed, in use of the above mentioned materials, by coating and adding a variety of assistant agents when necessary, or by dissolving or dispersing suitable solvents, in utilizing one or more of coating methods known in the art such as, for example, a blade coating method, an air knife coating method, a gravure coating method, a squeeze coating method, a roller coating method, a spray coating method, a dip coating method, a bar coating method or the like.

Furthermore, this invention provides a recording method having a feature that the above recording materials are used. This invention preferably provides a recording method in which printing is made in an electrophotographic method and, more preferably, a recording method for recording material in which toners are transferred to an intermediate transfer drum from an electrophotographic photosensitive drum and subsequently transferred from the intermediate transfer drum to the recording material.

An electrophotographic method used in this invention to be employed is not especially limited and, for example, one or more of methods as described in "Denshi Shashin Gijyutsu no Kiso to Oyo" (Fundamentals and Applications for Electrophotography) and "Denshi Shashin Gijyutsu no Kiso to Oyo 2" (Fundamentals and Applications for Electrophotography $2^{nd}$) edited by Denshi Shashin Gakkai, published by Corona Publishing Co., Ltd. The toner types and methods are not limited especially. Printing can be made on one side or double sides of a postcard.

As toners used in the color electrophotographic method, known toners can be used. It is preferable to form images with three colors constituted of yellow, magenta, and cyan, or with four colors constituted of those three colors and black. Furthermore, two or more toners having different densities of respective colors can be used. In addition, transparent or white toners can be used.

Furthermore, toners having a UV absorbability, or toners containing various additives raised above as additives for the image receiving layer may be used. For example, the toner containing an anti-color fading agent provides an advantage capable of forming toner images excelling in image preserving property. It may be possible to use two or more toners which are reacted to develop some functions. Furthermore, the toner having a higher softening point than others may be used together as, what is called, a matte agent. It also may be possible that effective density is changed to form a part of the gradation by using toners having different contact angles with respect to the toner image receiving layer in a melting state and controlling the spreading of each toner during fixation.

As preferable specific examples of the recording material of the invention, the recording material as described above in which plural postcards can be provided by cutting is exemplified. With such a material, it is preferable to render the recording material of one sheet printed with four or eight postcards in terms of productivity in printing. Particularly preferable Is a recording material printed with copies of four or eight official postal cards on the recording material of one sheet. The recording material can have in a sheet or a stripe shape, or roll shape for longer roll. From a viewpoint to efficiency for. printing, it is preferable to used a roll shaped material. Where a roll type material is used, it is preferable to cut the roll into a sheet having a length of the final product within the printer, so that it is also Preferable to use a printer having such a function.

As other specific examples of the recording material of the invention, photo printed items in the L or 2L size, business or name cards with pictures or photos, tickets, calendars, photo printed items with frames, etc. can be exemplified, and any of those is desirable. Where the invented recording material is used, a printed item with a frame having no white margin portion can be produced in the electrophotographic printing method.

EXAMPLES

The present invention will now be described in details with reference to the following examples. Materials, utilization amounts, proportions, operations or the like shown in the following examples can be suitably changed as long as those are not deviated from the purpose of the invention. Thus, the scope of the invention is not limited to the examples shown below.

First Test and Comparative Example

Mirrorcoat, Platinum MKP-174 (product name, made by Oji paper Co., Ltd.) as a cast coated paper commercially available was cut into the A4 size to form Example 101. Grooves shown in Table 2 were formed in a way of a layout shown in FIG. 1 on Example 101 to produce Example 102. FIG. 1 is a diagram showing formation of grooves on an A4 size recording material for cutting out four L size sheets (horizontally 11.7 cm×vertically 8.8 cm).

A composition as below was coated with a wire coater to form 10 g/$m^2$ of the solid portion on MKP-174, thereby forming a polymer layer to form Example 103.

(Composition for Image Receiving Layer)

Polyester resin (TUFTONE U. 5 manufactured by Kao Corporation) 100 g

Titanium dioxide (TIPAQUE® A. 220 manufactured by Ishihara Sangyo Kaisha, Ltd.) 15 g Methyl ethyl ketone 400 g Grooves shown in Table 2 formed on the opposite side to the side on which the resin of Example 103 was coated were formed in the layout shown in FIG. 1, thereby producing Examples 104 to 110. The obtained Examples were left for a week at temperature of 35° C. and relative humidity of 55% and subsequently, the following evaluation was made

TABLE 2

| | Example Contents | | | | | | Evaluation Results | |
|---|---|---|---|---|---|---|---|---|
| | | Groove size (μm) | | | | | | |
| Example Number | Layer structure of Examples | Groove width | Groove length | Groove interval | Groove depth | Rate (%) | Image quality (comments) | Required Time for A4 printing one sheet production (other comments) |
| 101 (Comparative Example) | No polymer layer is coated, MKP-174 sole. | No groove is formed. | | | | — | 1.6 points (large gross difference) | 90 seconds |
| 102 (Comparative Example) | No polymer layer is coated MKP-174 sole. | 40 | 150 | 100 | 110 | 63 | 1.2 points | 40 seconds |
| 103 (Comparative Example) | Polyester resin (U-5) layer on one side | No groove is formed. | | | | — | 4.2 points | 90 seconds |
| 104 (Comparative Example) | Polyester resin (U-5) layer on one side | 40 | 150 | 100 | 170 | 92 | 2.5 points | 40 seconds (Paper broken during printing) |
| 105 (Comparative Example) | Polyester resin (U-5) layer on one side | 40 | 150 | 100 | 80 | 43 | 4.2 points | 100 seconds (Re-cutting due to cutting failures) |

TABLE 2-continued

| | Example Contents | | | | | | Evaluation Results | |
|---|---|---|---|---|---|---|---|---|
| | | Groove size (μm) | | | | | | |
| Example Number | Layer structure of Examples | Groove width | Groove length | Groove interval | Groove depth | Rate (%) | Image quality (comments) | Required Time for A4 printing one sheet production (other comments) |
| 106 (This invention) | Polyester resin (U-5) layer on one side | 10 | 150 | 100 | 110 | 60 | 4.0 points (End face disordered) | 40 seconds (there were cutting failures) |
| 107 (This invention) | Polyester resin (U-5) layer on one side | 150 | 150 | 100 | 110 | 60 | 3.6 points (End face undulated) | 40 seconds (Defects occur at end portions) |
| 108 (This invention) | Polyester resin (U-5) layer on one side | 40 | 150 | 500 | 110 | 60 | 4.0 points | 50 seconds (there were cutting failures) |
| 109 (This invention) | Polyester resin (U-5) layer on one side | 40 | 20 | 100 | 110 | 60 | 3.8 points | 40 seconds (there were cutting failures) |
| 110 This invention) | Polyester resin (U-5) layer on one side | 40 | 150 | 100 | 110 | 60 | 4.2 points | 40 seconds |

"Rate" means a percentage indication of a rate of groove depth to the whole thickness of the recording material.

(Evaluation Method)

On the above Examples, photos were printed using an electrophotographic copier, DocuClor1250 made by Fuji Xerox Co. After printed, the Examples were cut out in the L size. Since grooves or holes were formed, the Examples that can be cut out by hands were cut by hands. The Examples that cannot be cut out by hands were cut with a cutter in measuring the size.

Image quality of the obtained photos were evaluated by five employees whose responsibility is to evaluate photos at Ashigara Laboratory, Fuji Photofilm Co. to render five-grade evaluation. The evaluation standard was: 1=very inferior; 2=lightly inferior; 3=generally permissive; 4=good; 5=very good. Time for printing production of the L size was measured.

Table 2 shows the results all together. As apparent from Table 2, the recording material of the invention has a good image quality as photos and can make printing easily, surely and rapidly with good printing productivity per unit time. In the Examples having no groove, cutting had to be made with the cutter in measuring the size, so that cutting failure tends to occur, in addition to taking longer time, and so that sometimes, the Examples became useless. With Example 105 having shallower grooves than those defined in this invention, cutting failures occur when the material was cut by hands, so that the material was required to be cut again with the cutter. With Example 104 having deeper grooves than those defined in this invention, the Example was problematically broken during printing. With Examples 101, 102 having no resin layer of the invention, the high density portion had high gloss, whereas the low density portion had low gloss, thereby creating very unnatural photo printed items, which were not permitted.

Second Test

In production of Example 110 of above First Test, grooves were made on a side on which the resin was coated to produce Example 111. Printed image quality was evaluated in the same manner as First Test, but images became disordered around the grooves, leaving not favorable results.

As described above, where the recording material of the invention is used, the printed material in the desired size can be formed easily and rapidly. Where the recording material of the invention is used, digital image information can be printed in the desired size easily and in a shorter period of time, so that printed items in the desired size having high image quality same as that of photos are obtainable quickly and easily. The printed items with a frame having no white margin portion can be produced in the electrophotographic method.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A recording material comprising an image receiving resin layer containing a polyester resin as a main component and a support having the image receiving layer thereon, the recording material further comprising a groove or grooves intermittently extending linearly with a depth not less than 45% but not more than 90% of the thickness of the recording material, wherein the width of the grooves is not less than 15 μm and not more than 130 μm, the length of the grooves is not less than 50 μm and not more than 500 μm, and the interval between the grooves is not less than 30 μm and not more than 300 μm.

2. The recording material according to claim 1, wherein the width of the grooves is not less than 20 μm and not more than 100 μm, the length of the grooves is not less than 60 μm and not more than 300 μm, and the interval between the grooves is not less than 50 μm and not more than 250 μm.

3. The recording material according to claim 2, wherein the width of the grooves is not less than 30 μm and not more than 80 μm, the length of the grooves is not less than 100 μm and not more than 250 μm, and the interval between the grooves is not less than 80 μm and not more than 180 μm.

4. A recording material comprising an image receiving resin layer containing a polyester resin as a main component and a support having the image receiving layer thereon, the recording material further comprising a groove or grooves placed continuously or intermittently extending linearly with a depth not less than 45% but not more than 90% of the thickness of the recording material, wherein the groove or grooves are formed on a side opposite to the side of the support on which the resin layer is formed.

* * * * *